June 26, 1962  R. H. SHOQUIST  3,040,856
REVERSIBLE COIL TYPE ACTUATOR FOR FRICTION COUPLINGS
Filed March 7, 1960  4 Sheets-Sheet 2
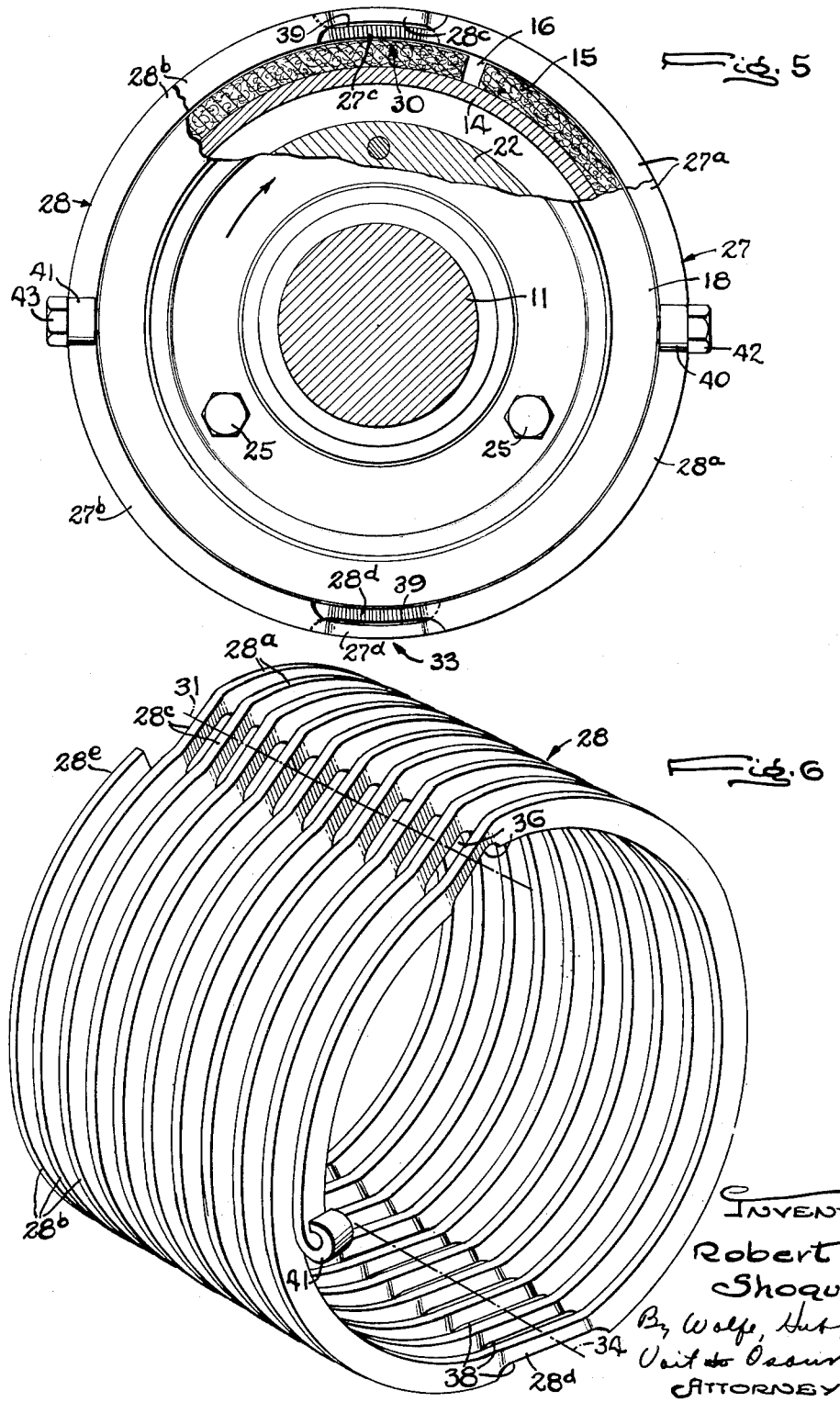

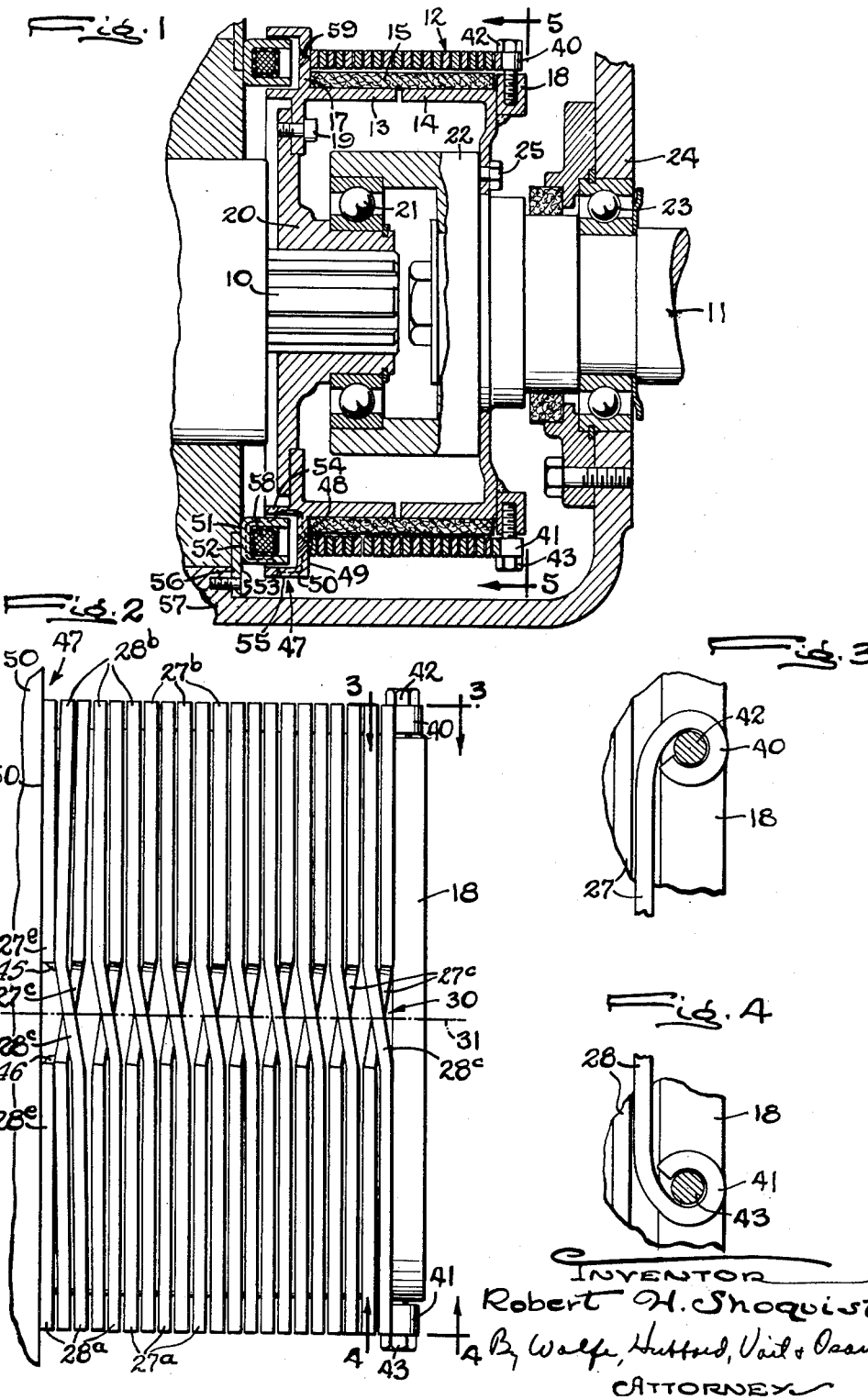

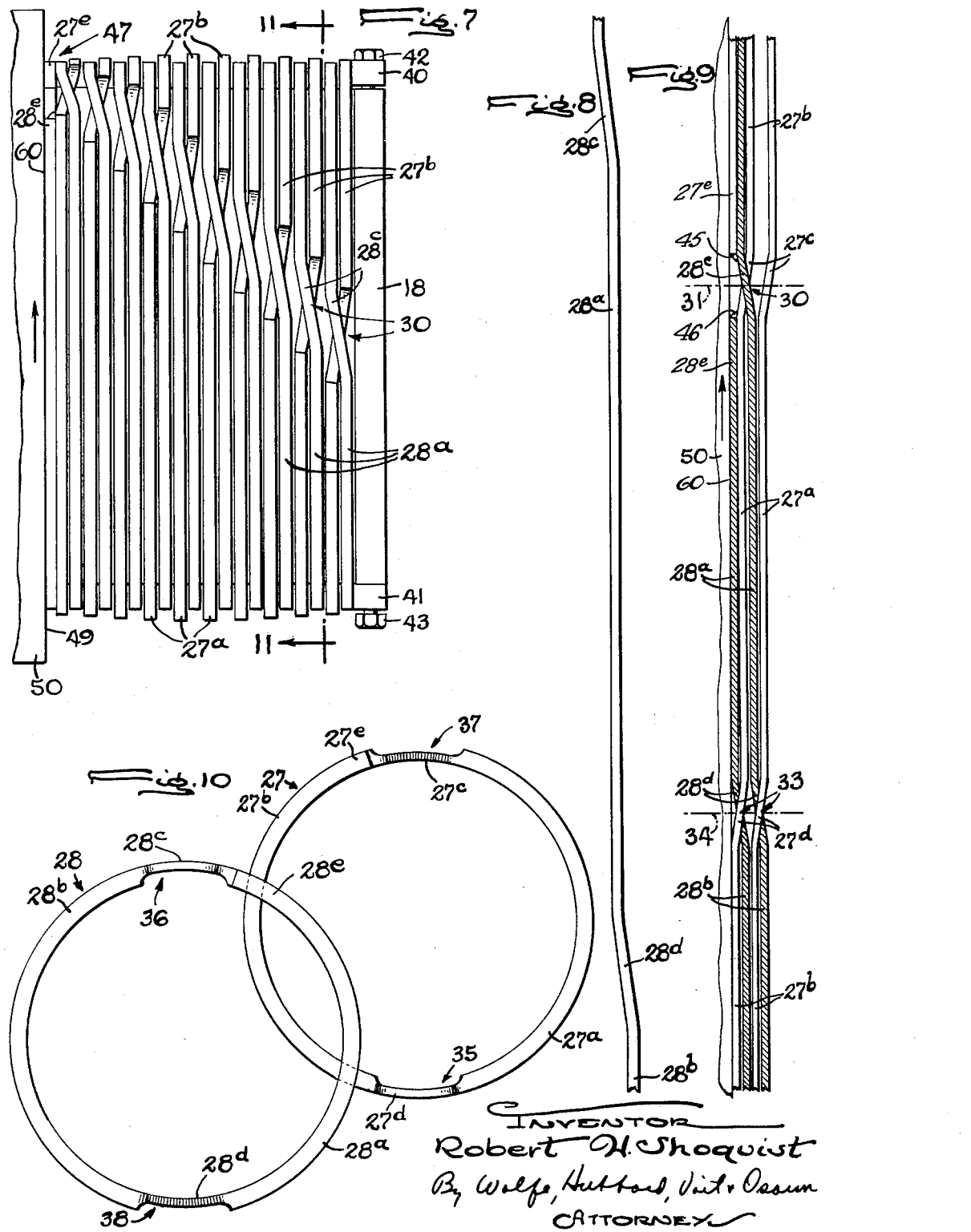

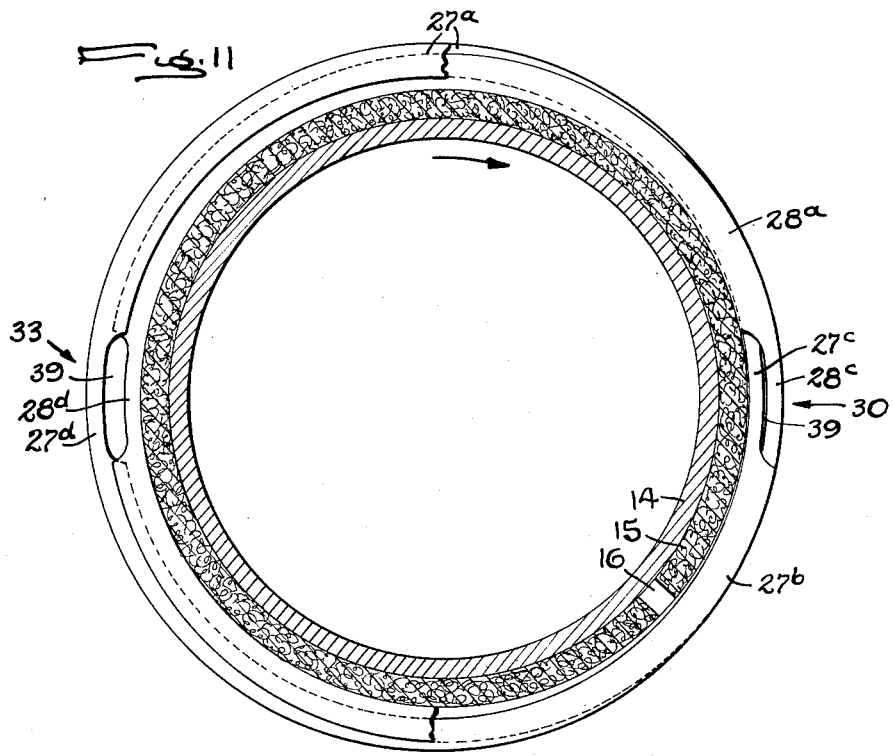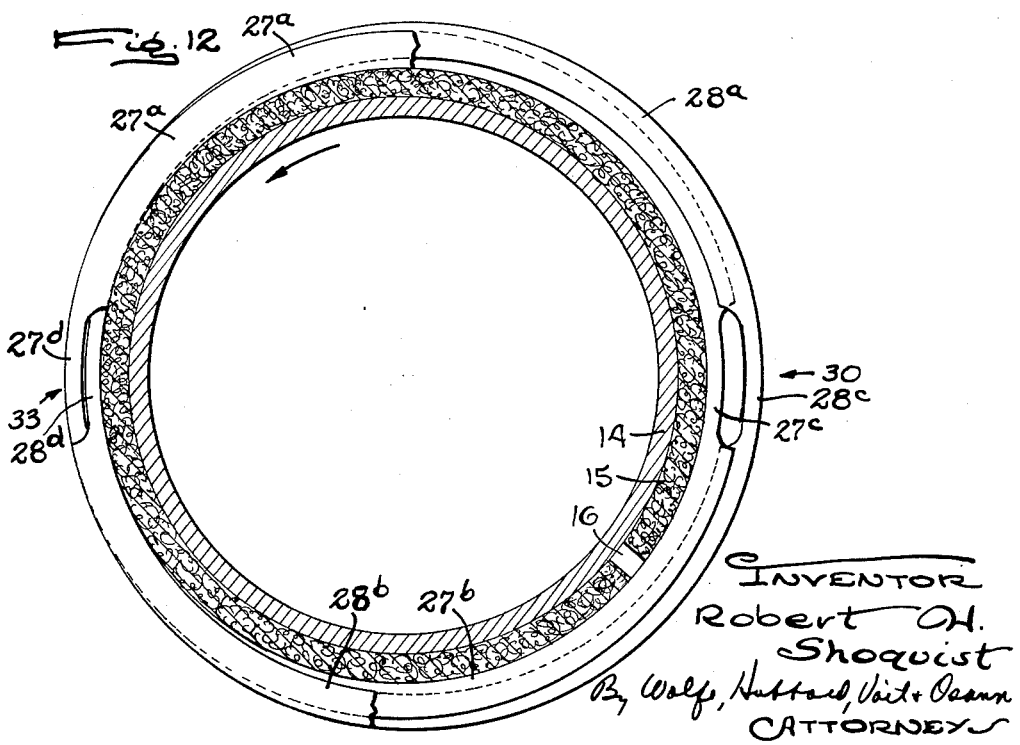

United States Patent Office 3,040,856
Patented June 26, 1962

3,040,856
REVERSIBLE COIL TYPE ACTUATOR FOR FRICTION COUPLINGS
Robert H. Shoquist, Beloit, Wis., assignor to Warner Electric Brake & Clutch Company, South Beloit, Ill., a corporation of Illinois
Filed Mar. 7, 1960, Ser. No. 13,133
19 Claims. (Cl. 192—81)

This invention relates to an actuator for friction clutches and brakes of the type in which the coupling is effected by the winding or unwinding of a helically wound coil of resilient wire and has more particular reference to a coupling in which the helix constitutes an actuator for pressing an arcuate friction band or shoe radially into gripping engagement with at least one rotating surface of the parts to be coupled.

The primary object is to provide a coupling of the above character which is engageable in either direction by the selective activation of two helical coils wound reversely about a common axis and engageable respectively with the same friction surface to transmit oppositely directed torques.

Another object is to wind the actuating helices together in a novel manner to avoid interference between the two during the winding up of one helix while the other is being unwound.

A further object is to control the simultaneous winding and unwinding of both helices in either direction of torque transmittal by a novel pilot clutch which serves both of the helices.

The invention also resides in the novel manner of crossing the adjacent turns of the two helices.

Other objects and advantages of the invention will become apparent from the following detailed description taken in connection with the accompanying drawings, in which—

FIGURE 1 is a fragmentary diametrical cross-section of a reversible friction clutch incorporating an actuator embodying the novel features of the present invention.

FIG. 2 is an elevational view with the parts in clutch-released positions.

FIGS. 3 and 4 are fragmentary sections taken respectively along the lines 3—3 and 4—4 of FIG. 2.

FIG. 5 is a section taken along the line 5—5 of FIG. 1.

FIG. 6 is a perspective view of one of the actuating helices.

FIG. 7 is a view similar to FIG. 2 with the parts of the actuator in clutch-engaged position.

FIG. 8 is a development view of part of a turn of one of the actuator coils.

FIG. 9 is a fragmentary development view of the turns of the two coils at the unanchored end thereof, one coil being sectioned for contrast.

FIG. 10 is an end view illustrating the manner of assembling the two coils.

FIG. 11 is a cross-sectional view taken along the line 11—11 of FIG. 7 with clutch engaged for transmitting torque in one direction.

FIG. 12 is a view similar to FIG. 11 with the clutch transmitting torque in the opposite direction.

The improved multiple coil actuator may be utilized to frictionally couple two relatively rotatable elements together either by direct engagement with a rotatable surface on one or both of the elements or indirectly by utilizing the coils as actuators for a main friction clutch or brake by which the coupling is effected. For purposes of illustration, the invention is shown in the drawings embodied in a clutch of the latter type comprising generally a friction band 15 encircling drums 13 and 14 carried by driving and driven shafts 10 and 11. Herein, the drums are of equal size with external surfaces which may be coned but in this instance are of cylindrical contour and disposed end to end.

While the band may be composed of various materials and divided into several parts, it is shown herein as a single strip of non-metallic friction material such as that used for ordinary brake linings. It is wrapped loosely around the drums 13 and 14 between flanges 17 and 18 thereon with its ends separated by a gap 16 (FIGS. 5 and 11) wide enough to allow for full collapse of the band around the drums and under pressure even after substantial wearing in service use. The band is disconnected from the drums and remains unanchored so as to be free to float circumferentially relative to each of the drums.

An inturned flange at the outer end of the drum 13 is clamped by screws 19 against a flange on a collar 20 splined onto the inner end of the shaft 10. Herein, the latter is journaled in a bearing 21 carried by a hub 22 on the inner end of the driven shaft 11 which is journaled in a bearing 23 on a stationary support 24. An inturned flange on the outer end of the drum 14 is clamped by the screws 25 to the hub 22. The two drums are thus alined axially and supported for rotation relative to each other or in unison when coupled together by contraction of the band under radial pressure.

The improved actuator constituting the present invention comprises generally two cylindrical helices 27 and 28 of substantially equal diameters coiled concentrically about the clutch axis and the band 15 and reversely wound with the turns of one coil alternating with the turns of the other coil. As a result, one coil is wound up and the other is unwound in response to the application of a pilot or control torque between opposite ends of the two interleaved coils. Accordingly, the band 15 is collapsed and the main clutch engaged by one of the coils when the two are subjected to a control torque acting in one direction between the coil ends and by the other coil when the control torque is in the opposite direction.

Herein, each of the coils 27, 28 is composed of resilient steel wire preferably of rectangular cross-section successive turns of the two coils alternating with each other in side by side relation along the clutch axis and across the outer surface of the band with which the two coils telescope loosely as shown in FIG. 1 when the main clutch 12 is released. Such alternating or interleaving of the turns with the coils reversely wound is made possible by winding the coils in a novel manner so as to offset opposite half portions $a$ and $b$ of each coil and dispose the same in axially spaced parallel planes as shown in FIGS. 1, 8 and 9 while joining the adjacent ends of such portions by relatively short diagonally extending parts or cross-pieces $c$ and $d$ are inclined circumferentially in the same direction in the case of one coil but are oppositely inclined in the other coil. The parts $27^a$, $27^b$ thus cross the parts $28^a$, $28^b$ at points 30 and 33 thereby achieving the reverse winding of the two helices while permitting simultaneous winding of one coil and unwind of the other in service use of the final assembly. Preferably, though not necessarily, when the coils are free and of the same diameter as shown in FIGS. 1 and 2, the crossing points 30 are spaced along an element 31 of the cylinder defined by the interleaved helices and on one side thereof while the crossing points 33 of the parts $27^b$ and $28^b$ are disposed in a similar row and spaced along an element 34 (FIG. 9) on the diametrically opposite side of the helices. The crosspieces $27^c$, $27^d$, $28^c$ and $28^d$ are of sufficient length to accommodate the alternating of the parallel portions $27^a$, $27^b$, $28^a$ and $28^b$ of the two coils which as shown in FIG. 2 lie side by side with only a narrow clearance between them. Of course, such clearance, usually about one-tenth the width of the coil wire, is sufficient to allow for the axial elongation of the active helix at the latter is being wound up and thus reduced somewhat in diameter.

To permit of full engagement of the band 15 by the inner edges of the parallel portions 27a, 27b of the coil 27 or alternatively 28a, 28b of the coil 28, the diagonal crosspieces on one coil underlie and are disposed in inwardly opening notches in the crosspieces of the other coil. Herein, the inwardly opening notches are formed on one crosspiece along one side of one coil and on the diamertically opposite side of the other coil thereby facilitating assembly or interwinding of the reversely wound helices as later described. While the notches may be produced by radial bending of the coil wires, it is preferred to form them by milling away the inner edge portions of the crossed parts 27c and 28c as indicated at 35 and 36 in FIG. 10. These notches extend over the full arcuate length of the crossed parts and in effect interlock with similar but outwardly opening notches 27b, 28b formed by correspondingly milling away the outer edge portions as indicated at 37, 38 of the diagonal parts 27b, 28b.

By thus notching both of the crossed parts and interlocking the notches, each helical coil is of the same radius at all points along its length. The radial depth of the notches need only be a little greater than half the radial thickness of the coil wires in order to leave a narrow radial clearance 39 (FIG. 5) between the crossed parts when the two coils 27, 28 are relaxed and of the same diameter as shown in FIGS. 1, 2 and 5. The crossed parts are weakened somewhat by such notching but are nevertheless capable of withstanding the stressing incident to contracting of the band 15 and engaging the main clutch since virtually all of the coupling torque is transmitted through the band 15. That is to say, the coil carries only the pilot or control torque for winding up one coil and compressing it around the band.

Intereference between the crossed parts is avoided by holding at least one of the ends of the two coils 27, 28 against relative angular displacement. This is accomplished in the present instance by anchoring the coil ends to the driven drum 14 as by bending the wires to form eyes 40, 41 (FIGS. 1 to 4) around screws 42, 43 threaded radially into the flange 18 on the drum.

Preferably and for a purpose to appear later, the opposite ends 27e, 28e, of the coils 27, 28 are also joined together to turn in unison during winding of one helix and unwinding of the other. As shown in FIGS. 2 and 9, this may be accomplished by pressing the extreme tip of the end 27e against the adjacent turn of the coil 28 near the cross-over part 28c and securing the wires together by solder or weld metal as indicated at 45. In a similar way, the tip of the end 28e is welded at 46 (FIG. 9) to the adjacent turn of the coil 27 at the end of the part 27c adjacent the line 31.

Winding up of the helix 27, 28 and unwinding of the other is effected by a selectively controllable pilot clutch indicated generally at 47 and operating when energized to grip the end turns 27e, 28e and turn the same with the driving drum 13 until the main clutch becomes energized. Preferably, the pilot clutch is of the magnetic friction type in which the turns 27e, 28e constitute an armature ring adapted for axial gripping engagement with inner and outer pole faces 48, 49 on a ring 50 (see FIGS. 1 and 9). The latter is fast on and rotates with the driving drum 13 and cooperates with the armature ring 27e, 28e and the core 51 of a magnet 52 to form a flux circuit 53 of toroidal shape. To this end, the core 51, which is mounted stationarily, is U-shaped in cross-section with its concentric pole pieces telescoping closely with inner and outer flanges 54, 55 on the ring 50. The back of the core is welded to a ring 56 which in turn is bolted to a stationary part 57. A multiple turn winding 58 is enclosed by and secured to the core between the flanges thereof.

The pole faces 48, 49 are separated from each other magnetically as by a ring 59 of non-magnetic material converging axially to a narrow circular gap disposed about midway between the inner and outer edges of the armature ring. As a result, the magnetic flux is directed in the well defined path 53 into one edge portion of the armature and out the other portion. By joining the ends 27e, 28e together, the armature surface 60 of the pilot clutch extends over nearly a full revolution and is fully effective in both directions of operation of the clutch.

The two helices 27, 28 constructed as above described may be assembled in the relation shown in FIGS. 1 and 2 by shifting the two coils sidewise after inserting the turns of one coil in between those of the other coil as illustrated in FIG. 10. As the shifting of one coil is continued, the inwardly opening notches 35 on such coil come into registry with the outwardly opening notches 38 and the notches 37 are, by a slight relative turning of the coils, brought opposite the notches 36 of the other coil. After assembly in this manner, the coil ends 27e, 28e are secured together and ground off to dispose the armature surface 60 in a true axial plane.

Finally, the eyes 40, 41 are bolted to the driven drum 14 and the resulting assembly is telescoped onto the band 15 loosely supported by the drum 13. In the final assembly shown in FIGS. 1 and 2, the armature face 60 is disposed close to and substantially in light mechanical contact with the pole faces 48, 49.

Considering the operation of the double helix actuator, let it be assumed that the magnet is deenergized so that no winding torque is applied to either of the coils. As shown in FIGS. 1 and 2, the latter are then of equal diameter, concentric with the clutch axis, and telescoped loosely around the free floating band 15 which in turn is similarly telescoped around the adjacent ends of the two drums 13, 14. The cross-over points 30 and 33 are thus disposed along the elements 31 and 34 of the cylindrical helices as shown in FIGS. 2 and 9.

Now, let it be assumed that the magnet winding 58 is energized with the driving shaft 10 turning clockwise as indicated by the arrow in FIGS. 5 and 11. The magnetic flux threading the toroidal path 53 over the full circumference thereof attracts the armature and draws the face 60 thereof into gripping engagement with the rotating pole faces 48, 49. A friction torque is thus exerted on the armature in a direction to wind up the coil 28 and unwind the coil 27 relative to the opposite ends 40, 41 which are anchored on the driven drum 14. In this winding action, the diameter of that portion of the coil 27 intermediate its ends is increased as shown in FIG. 7 while the coil 28 is contracted around the band 15 to press the full length thereof radially against the drums 13, 14. The latter are thus coupled together frictionally and adapted to transmit from the driving shaft to the driven shaft a torque which is determined by the degree of energization of the pilot clutch 47 and its winding 58. After such full engagement, the armature slips relative to the pole faces 48, 49, the wound up actuator coil 28 holding the main clutch engaged so long as the winding 58 is energized.

In such a winding up and contraction of the coil 28 and simultaneous unwinding and expansion of the other coil 27 the crossed parts 27a, 27b, 28a, 28b of the two coils shift around the clutch axis in unison and in the same direction. Since these parts are joined together at both ends, the crossing points 30 and 33 thus become stepped progressively around the clutch axis as shown in FIG. 7, the same crossed relation being maintained in all degrees of contraction and expansion of the reversely wound coils.

The winding up or contraction of the active coil 28 is accompanied by inward movement of the cross-piece 28c while in the unwinding and expansion of the coil 27, the underlying cross-piece 27d tends to shift outwardly. As soon as the clearance 39 (FIG. 5) is taken up as the crossed pieces 27d and 28c come into contact, further expansion of the inactive coil 27 is permitted by shifting of the coil eccentrically of the clutch axis. This is indicated by the increase in clearance 39 between the crossed pieces 27c and 28 at the left side of FIG. 11. Therefore, there is no blocking interference between these parts of the two coils in spite of their crossed and overlapping relation and the reversed winding of the two helices.

The fact that the two helices are joined together at both of their opposite ends does not interfere with the small expansion of the inactive helix which accompanies the contraction of the other helix as the latter compresses the band 15 to engage the main clutch 12. Thus, the ends of the two helices remain of fixed diameter due to the anchoring of the ends 40, 41 and to the joints 45, 46 in the armature end, but the intervening length of the inactive helix is free to expand as shown in FIG. 7 and thus bulge outwardly enough to allow enough contraction of the active helix to engage the main clutch even after substantial wearing of the band.

The band 15 is contracted and the main clutch engaged in the same way and in response to energization of the magnet when the driving shaft is rotating in the opposite or counter-clockwise direction as indicated by the arrow in FIG. 12. In this case however, the coil 27 is wound up and the coil 28 unwound and eventually shifted somewhat off-center. Also, the cross points 30 and 33 shift out of the released position shown in FIG. 2 and counter-clockwise until the coil 27 has contracted the band 15 tightly around the drums 13 and 14.

It will be apparent from the foregoing that one of the helical coils 27, 28 cooperates with the drums 13, 14, the band 15 and the pilot clutch 47 to form a unidirectionally operable clutch controllable by the magnet winding 58. By the present invention, this simple clutch is made reversible merely by the addition of a second helical coil of the same diameter as and interwound with the latter so as to occupy no greater space either axially or radially. The desired reversibility is achieved at minimum cost and with no increase in the overall dimensions.

I claim as my invention:

1. A friction coupling having, in combination, two drums of substantially equal size disposed end to end and mounted for relative turning about a common axis, a free floating friction band overlapping the adjacent portions of said drums and loosely telescoped on the latter, said band being changeable in diameter to grip the drums frictionally and thereby transmit torque from one drum to the other, a loosely wound helix loosely telescoped with said band for free turning relative thereto, a second loosely but oppositely wound helix of similar length and diameter telescoped with said band with successive turns thereof alternating with the turns of said first helix, arcuate parts of each turn of said helices being bent and disposed diagonally of said axis to axially offset the adjacent arcs of the turns of each helix and cross the diagonal parts of the different helices, and means for deriving a torque from the relative turning of said drums and applying the same between opposite ends of said helices whereby to expand one helix and contract the other and thereby compress said band against said drums by one of said helices.

2. A friction coupling having, in combination, two members mounted for relative rotation about a common axis, one member being a driver and being rotatable in opposite directions, a friction element concentric with said axis and adapted to be compressed radially to couple said members together frictionally and thereby transmit torque from the driving member to the other member, first and second helices reversely wound relative to each other about said axis with the turns of one helix alternating with those of the other and the turns of the respective helices having parts extending diagonally of said axis and in opposite directions so as to cross each other at points spaced along one side of the helices, said helices telescoping loosely with said friction element, and means for applying a control torque simultaneously between opposite ends of said two helices in either direction of turning of said driving member whereby to wind up one member and unwinding the other and thereby compress said element radially by one of said helices.

3. An actuator for a friction coupling comprising first and second helices of substantially equal size wound about a common axis with the turns of one helix alternating with those of the other helix and the turns of both helices each comprising two parallel arcuate portions disposed in axially offset parallel planes and joined by connecting pieces extending diagonally of said axis, said connecting pieces of the respective helices being oppositely inclined to effect reverse winding of the helices and form crosses arranged in a row which parallels said axis when said helices are free but extends diagonally of the axis after winding up of one helix and corresponding unwinding of the other helix, and means for maintaining the pieces of each cross in fixed relation during angular shifting of the crosses.

4. An actuator for a friction coupling comprising first and second helices of substantially equal size wound about a common axis with the turns of one helix alternating with those of the other helix and each helix having parallel arcuate portions disposed in axially offset parallel planes and joined by connecting pieces extending diagonally of said axis, said connecting pieces of the respective helices being oppositely inclined to effect reverse winding of the two helices and form a series of crosses spaced along said axis, and means for exerting a torque simultaneously between opposite ends of said two helices to wind up one helix and unwind the other, and means acting during such winding to maintain the pieces of each cross in fixed angular relation while permitting shifting of the crosses around said axis.

5. A friction coupling actuator as defined in claim 4 in which one of the connecting pieces in the successive turns of one of said helices underlies and is disposed in inwardly opening notches formed in the corresponding crossing pieces of the other helix.

6. An actuator for a friction coupling comprising first and second helices of substantially equal size wound about a common axis with the turns of one helix alternating with those of the other helix and each helix having parallel arcuate portions disposed in axially offset parallel planes and joined by connecting pieces extending diagonally of said axis, said connecting pieces of the respective helices being oppositely inclined to effect reverse winding of the two helices and form a plurality of crosses arranged in two rows angularly spaced around and extending along said axis, and means for maintaining the pieces of each cross in fixed relation during winding of one helix and unwinding of the other.

7. A friction coupling actuator as defined in claim 6 in which the crosspieces of one helix in one of said rows are disposed in inwardly opening notches formed in the crosspieces of the other helix and the crosspieces of the latter in the other of said rows are disposed in inwardly opening notches formed in said one helix.

8. An actuator for a friction coupling comprising first and second helices of substantially equal size wound about a common axis with the turns of one helix alternating with those of the other helix and each turn having parallel arcuate portions disposed in axially offset parallel planes and joined by connecting pieces extending diagonally of said axis, said connecting pieces of the respective helices being oppositely inclined and crossing each other to effect reverse winding of the two helices, and means operable during winding up of one helix and unwinding of the other to maintain the pieces of each cross in fixed relation with respect to each other, the opposed edges of the crosspieces of each cross being cut away to form notches interlocked with each other at the same radius as the remainder of the helices.

9. A friction coupling actuator as defined in claim 8 in which said crosses are arranged in two rows along diametrically opposite sides of the helices with the notches of one helix disposed in one of said rows opening inwardly and the notches in the other row opening outwardly.

10. An actuator for a friction coupling comprising first and second helices of substantially equal size wound about a common axis with the turns of one helix alternating with those of the other helix and each helix having parallel arcuate portions disposed in axially offset parallel planes and joined by connecting pieces extending diagonally of said axis, said connecting pieces of the respective helices being oppositely inclined and crossing each other to effect reverse winding of the two helices, and means securing the turns at one end of said helices together to shift the pieces of the crosses in unison and in the same direction during the winding up of either helix while the other is being wound.

11. A friction coupling actuator as defined in claim 10 including means for joining the turns at the opposite ends of the helices for turning of the two in unison.

12. A friction coupling actuator as defined in claim 10 including a friction pilot clutch having driving and driven elements adapted for axial gripping engagement, one of said elements being formed by the turns of said helices opposite said securing means.

13. A friction coupling actuator as defined in claim 10 including a magnetic pilot friction clutch having pole and armature faces adapted for axial gripping engagement, said armature faces being formed by the turns of said helices at the ends of the latter opposite said securing means.

14. A friction coupling actuator as defined in claim 13 including means for holding said armature faces together for turning in unison in either direction of application of the pilot clutch torque.

15. In a reversible coupling for transmitting torque between two members relatively rotatable about a common axis, the combination of, two resilient helices of equal diameters wound in opposite directions about said axis with the turns thereof alternating with each other, selectively controllable means for applying torque between opposite ends of said helices in a direction determined by the direction of relative rotation between said members whereby to wind up one helix and simultaneously unwind the other according to the direction of such relative rotation, and torque transmitting means including a part closely telescoped with said helices and frictionally gripped by one of the helices in response to activation of said last mentioned means.

16. An actuator for a friction coupling comprising first and second helices of substantially equal size wound about a common axis with the turns of one helix alternating with those of the other helix and each helix having parallel arcuate portions disposed in axially offset parallel planes and joined by connecting pieces extending diagonally of said axis, said connecting pieces of the respective helices being oppositely inclined to effect reverse winding of the two helices and form a series of crosses spaced along said axis, a member rotatable in opposite directions about said axis, means deriving a control torque from said driving member in either direction of its rotation and applying such torque simultaneously between opposite ends of said helices to wind up one helix and unwind the other depending on the direction of turning of said member, and means acting during such winding for maintaining the pieces of each cross in fixed angular relation.

17. An actuator for a friction coupling comprising first and second helices of substantially equal size wound about a common axis with the turns of one helix alternating with those of the other helix and each helix having parallel arcuate portions disposed in axially offset parallel planes and joined by connecting pieces extending diagonally of said axis, said connecting pieces of the respective helices being oppositely inclined to effect reverse winding of the two helices and form a series of crosses spaced along said axis, a member rotatable in opposite directions about said axis, means deriving a control torque from said driving member in either direction of its rotation and applying such torque simultaneously between opposite ends of said helices to wind up one helix and unwind the other depending on the direction of turning of said member, and means joining opposite end turns of one helix to the corresponding end turns of the other helix and thereby maintain the crossed pieces of each cross in fixed angular relation during the application of said control torque in either direction.

18. A friction coupling comprising first and second helices of substantially equal size wound about a common axis with the turns of one helix alternating with those of the other helix and each helix having parallel arcuate portions disposed in axially offset parallel planes and joined by connecting pieces extending diagonally of said axis, said connecting pieces of the respective helices being oppositely inclined to effect reverse winding of the two helices and form a series of crosses spaced along said axis, a member rotatable in opposite directions about said axis, means deriving a control torque from said driving member in either direction of its rotation and applying such torque simultaneously between opposite ends of said helices to wind up one helix and unwind the other depending on the direction of turning of said member, a driven member rotatable about said axis, and a main friction device for coupling said driving and driven members together to transmit torque from the driving to the driven member in the direction of turning of the driving member, said device including an element telescoped with both of said helices and compressed radially by the respective helices in opposite directions of turning of the driving member when said control torque is applied.

19. An actuator for a reversible friction coupling having, in combination, two resilient helices of equal diameters wound in opposite directions about a common axis with the turns thereof alternating with each other along the axis and the adjacent turns crossing each other on diametrically opposite sides of the axis, and torque transmitting means including a part closely telescoped with said helices and frictionally gripped by one of the helices in response to activation of said last mentioned means.

References Cited in the file of this patent

UNITED STATES PATENTS

| 981,389 | Dearborn | Jan. 10, 1911 |
| 2,551,410 | Audemar | May 1, 1951 |
| 2,643,750 | Moulton | June 30, 1953 |
| 2,751,773 | Woodson | June 26, 1956 |
| 2,798,581 | Supitilov | July 9, 1957 |

FOREIGN PATENTS

| 112,158 | Germany | Aug. 13, 1900 |
| 903,033 | France | Jan. 5, 1945 |